June 20, 1950  S. A. SHEPELEVICH  2,512,508
BIFOCAL ELEVATION ATTACHMENT
Filed April 29, 1947
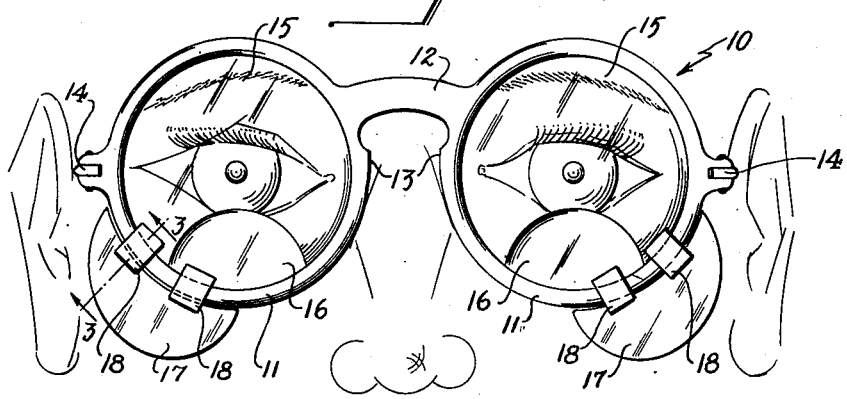
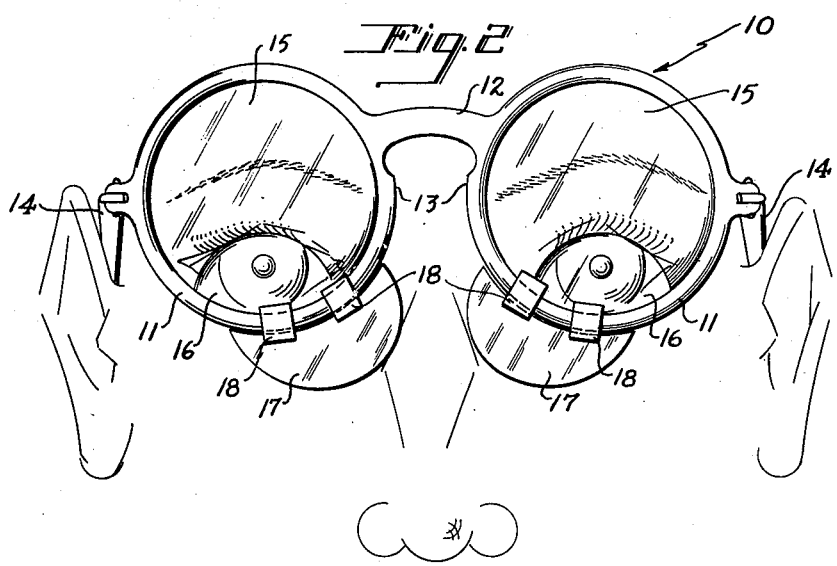
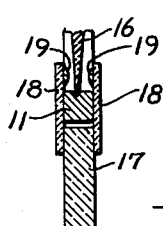
INVENTOR.
BY Samuel A. Shepelevich
ATTORNEY Patented June 20, 1950

2,512,508

UNITED STATES PATENT OFFICE 2,512,508

BIFOCAL ELEVATION ATTACHMENT

Samuel A. Shepelevich, New York, N. Y.

Application April 29, 1947, Serial No. 744,553

2 Claims. (Cl. 88—41)

The present invention relates to eyeglasses of the type having bifocal lenses, and more particularly, to frames for bifocal lens eyeglasses.

While the use of eyeglasses having bifocal lenses, either of the insert or integral form, is highly desirable for persons requiring vision correction both for distant and close eye work, because of the elimination of the need for carrying two pairs of eyeglasses and for their frequent interchanging on the face, such bifocal lens eyeglasses have certain definite and distinct shortcomings and disadvantages.

Thus, the use of bifocal lens eyeglasses is frequently accompanied by a strain of the eye, facial and neck muscles, resulting from the endeavor to direct and obtain clear and complete vision through only one of the lens portions at a time, and particularly during a change of vision from one lens portion to the other. This muscular strain is generally accompanied and evidenced by a strained and grotesque appearance of the face.

It is an object of the present invention to provide frames for bifocal lens eyeglasses which will do away with all muscular strain in the use of such eyeglasses.

It is another object of the present invention to provide frames for bifocal lens eyeglasses which will do away with the strained and unattractive facial appearance of the user.

It is also an object of the present invention to provide frames for bifocal lens eyeglasses which may be adjusted and supported on the face, in raised or lowered position, to selectively dispose the desired lens portion of the eyeglasses in proper alinement with the eyes for natural and unstrained vision through the selected lens portion.

It is still another object of the present invention to provide frames for bifocal lens eyeglasses which may be adjusted and supported on the face in selectively raised or lowered position, to accommodate individual requirements.

It is yet another object of the present invention to provide frames for bifocal lens eyeglasses which minimize the circulation of air under the eyeglasses, thereby reducing the chances for injury to the eyes from wind and dust.

It is a further object of the present invention to provide eyeglass frames of the character described having associated means for supporting them in raised position on the face which are removable and replaceable, thereby enabling the use of the frame and the eyeglasses in the conventional way.

It is a still further object of the present invention to provide eyeglass frames of the character described which are comfortable to wear; which are attractive in appearance and are simple and easy to use.

It is yet a further object of the present invention to provide eyeglass frames of the character described which are durable; which are of simple construction and are easy to assemble and economical to produce.

The foregoing and other advantages and superiorities of the eyeglass frames of the present invention will become more readily apparent to those skilled in the art from the one embodiment thereof shown in the accompanying drawing and from the description following. It is to be understood, however, that such embodiment is shown by way of illustration only, to make the principles and practice of the invention more readily comprehensible, and without any intent of limiting the invention to the specific details therein shown and described.

In the drawing:

Fig. 1 is a view in front elevation of bifocal lens eyeglasses having the frame of the present invention; shown as positioned on the face and adjusted for normal, distant vision;

Fig. 2 is a similar view of the same, shown in raised position on the face, to bring the reading or close work portion of the lenses in alinement with the eyes; and Fig. 3 is a section taken on line 3—3 of Fig. 1, to show one form of construction of the frame raising means.

Referring more specifically to the accompanying drawing, the eyeglasses of the present invention comprise a frame, generally designated as 10, having the individual lens frames, 11, of generally rounded shape, connected by the bridge, 12, and having the nose contacting pieces, 13, and hinged ear pieces, 14. The frame, 10, may be of any of the conventional materials, as tortoise shell, plastic, metal, or the like and of any conventional shape. Each of the lens frames, 11, may contain a bifocal lens having the upper, distant focus portion, 15, and the lower, close focus portion, 16.

Normally, the frame, 10, rests on the face in position for the lines of vision to pass through the upper, distant focus lens portions, 15, as shown in Fig. 1 of the drawing.

In order to enable the shifting of the line of vision from the upper lens portions, 15, to the lower, close focus lens portions, 16, without any resulting strain on the facial muscles or the muscles of the back of the neck, throwing the head back into an unnatural position and giving the face a strained appearance, there are provided runners, 17, on the lower halves of the lens frames, 11.

The runners, 17, may be of any suitable material, either the same as the frame 10, or of a colorless, transparent plastic material, so as to be as unnoticeable as possible on the face, and may each be, preferably of approximately crescent shape and of the same thickness as the frame 10.

The runners, 17, may be slidably secured on the lens frames, 11, as by means of spaced pairs of parallel guide lugs, 18, secured on opposite faces of the runners, 17, adapted to engage between them the thickness of the lens frame, 11, and extending above the inner edges of the lens frames, 11. Each lug, 18, may have on the inner face of its upper, projecting end, an inwardly facing projection, 19, which serves to retain the runner, 17, on the lens frame, 11, without interfering with its longitudinal movement thereon. The lugs, 18, may be made of a slightly resilient material, thereby permitting their being snapped on and off the frame.

For normal distant focus use, the runners 17, may be shifted on the lens frames in a direction away from one another, in which position they are out of contact with the face and do not affect the position of the eyeglasses on the face; serving only as a partial wind shield.

To shift the eyeglasses for close focus use, the runners, 17, are manually moved towards one another until they contact the face and are continued to be moved in the same direction until they raise the glasses sufficiently on the face to bring the lower lens portions, 16, in the line of vision, as shown in Fig. 2 of the drawing.

It will be apparent that the use of the runners 17 on the eyeglass frame, 10, makes possible the elimination of all muscular strain at present generally associated with the use of bifocal lens eyeglasses. It is also obvious that the runners, 17, may be readily moved to adjust the eyeglasses to the most useful and beneficial level on the face, and that such adjustment may be made with the same set of runners on any type, size or shape of face, without the need for any individual adaptation.

This completes the description of one embodiment of the eyeglass frames of the present invention. It will be readily seen that many modifications and variations of the same may be made by anyone skilled in the art, in accordance with the principles of the invention hereinabove set forth and without the use of any inventive skill or ingenuity. I therefore desire to be protected for any and all such variations and modifications that may be made within the spirit of the present invention and the scope of the claims hereto appended.

What I claim is:

1. In an eyeglass frame having lens frame portions connected by a bridge, means for adjusting the position of the eyeglass frame on the face comprising a nose rest freely slidably secured in dependent position on the lower part of each of said lens frame portions substantially solely in the plane of said frame portions and adapted to engage the nose while in different positions on the lens frame portions, each of said nose rests comprising a crescent shaped body of appreciable height at its widest point and of approximately the thickness of said lens frame portion, and parallel resilient elements secured to said nose rest extending above the thickness of the frame portion and having facing projections engaging over the frame thickness and adapted to retain said nose rest solely in substantially the plane of the lens frame portion.

2. In an eyeglass frame having lens frame portions connected by a bridge, means for adjusting the position of the eyeglass frame on the face, comprising a nose rest freely slidably secured in dependent position on the lower part of each of said lens frame portions, substantially solely in the plane of said frame portion and adapted to engage the nose while in different positions on the lens frame portion, each of said nose rests comprising a body of approximately the thickness of said lens frame portion and having an arcuate nose contacting edge and pairs of parallel resilient bars oppositely secured to opposed faces thereof, said bars extending above said body a distance greater than the thickness of a lens frame portion, the bars of each pair having facing projections at their free ends adapted to engage over the lens frame portion to retain said body thereon solely in the plane thereof.

SAMUEL A. SHEPELEVICH.

REFERENCES CITED

The following references are of record in the file of this patent:

UNITED STATES PATENTS

| Number | Name | Date |
|---|---|---|
| 222,123 | Blethen | Dec. 2, 1879 |
| 511,261 | Biegel | Dec. 19, 1893 |
| 1,393,152 | Miller | Oct. 11, 1921 |
| 1,723,475 | Esleek | Aug. 6, 1929 |
| 2,112,163 | Kimmel | Mar. 22, 1938 |
| 2,176,167 | Comstock | Oct. 17, 1939 |

FOREIGN PATENTS

| Number | Country | Date |
|---|---|---|
| 594,966 | France | July 7, 1925 |